United States Patent
Nguyen

(10) Patent No.: US 8,052,890 B2
(45) Date of Patent: Nov. 8, 2011

(54) COMPOSITIONS FOR DUST SUPPRESSION AND METHODS

(75) Inventor: Van G. Nguyen, St. Clair (AU)

(73) Assignee: 3M Innovative Properties Company, St. Paul, MN (US)

( * ) Notice: Subject to any disclaimer, the term of this patent is extended or adjusted under 35 U.S.C. 154(b) by 509 days.

(21) Appl. No.: 11/628,273

(22) PCT Filed: Jun. 2, 2005

(86) PCT No.: PCT/US2005/019476
§ 371 (c)(1),
(2), (4) Date: Sep. 17, 2008

(87) PCT Pub. No.: WO2005/121272
PCT Pub. Date: Dec. 22, 2005

(65) Prior Publication Data
US 2009/0090890 A1    Apr. 9, 2009

(30) Foreign Application Priority Data

Jun. 3, 2004  (AU) ................. 2004902960

(51) Int. Cl.
*C09K 3/22* (2006.01)
*B02C 1/00* (2006.01)
(52) U.S. Cl. ........... 252/88.1; 252/88.2; 241/15; 241/16
(58) Field of Classification Search ............. 252/88.1, 252/88.2; 241/15, 16
See application file for complete search history.

(56) References Cited

U.S. PATENT DOCUMENTS

| 4,417,992 | A | * | 11/1983 | Bhattacharyya et al. | 252/88.1 |
| 4,551,261 | A | * | 11/1985 | Salihar | 299/12 |
| 4,592,931 | A | * | 6/1986 | Cargle | 427/136 |
| 4,594,268 | A | * | 6/1986 | Kirwin | 427/136 |
| 4,610,311 | A | * | 9/1986 | Bronner et al. | 169/45 |
| 4,650,598 | A | * | 3/1987 | Roberts et al. | 252/88.1 |
| 4,746,543 | A | | 5/1988 | Zinkan et al. | |
| 4,801,635 | A | | 1/1989 | Zinkan et al. | |
| 4,897,218 | A | * | 1/1990 | Roe | 241/15 |
| 5,194,174 | A | | 3/1993 | Roe et al. | |
| 5,256,444 | A | | 10/1993 | Roe | |
| 6,132,638 | A | * | 10/2000 | Oldenhove | 252/88.1 |
| 6,620,772 | B2 | * | 9/2003 | Garnier | 508/491 |
| 2002/0148388 | A1 | * | 10/2002 | Varnadoe et al. | 106/278 |
| 2003/0069146 | A1 | * | 4/2003 | Garnier | 508/491 |

FOREIGN PATENT DOCUMENTS

EP  0134106  7/1984

OTHER PUBLICATIONS

Kirk-Othmer Encyclopedia of Chemical Technology 3rd Edition, vol. 22, at Table 24.

* cited by examiner

*Primary Examiner* — Mark Eashoo
*Assistant Examiner* — Jane L Stanley

(57) ABSTRACT

The present invention relates to compositions useful for the suppression of fugitive dust emissions and methods of suppressing dust emissions by application of an aqueous solution comprising a surfactant, wetting agent and an acrylic copolymer. The compositions of the invention are effective in wetting, penetrating and improving particle cohesion and reducing water evaporation. They can also be used as a knockdown agent for airborne dust and for minimizing soil and dust erosion, blowing and loss from roads and bulk solids, mineral flotation processes, waste management applications and as a binding agent.

23 Claims, No Drawings

COMPOSITIONS FOR DUST SUPPRESSION AND METHODS

FIELD OF THE INVENTION

The present invention relates to compositions useful for the suppression of fugitive dust emissions and methods of suppressing dust emissions by application of an aqueous solution comprising a surfactant, wetting agent and an acrylic copolymer. The compositions of the invention are effective in wetting, penetrating and improving particle cohesion and reducing water evaporation. They can also be used as a knockdown agent for airborne dust and for minimising soil and dust erosion, blowing and loss from roads and bulk solids, controlling coal dust, mineral flotation processes, waste management applications and as a binding agent.

BACKGROUND OF THE INVENTION

Dust dissemination poses safety, health and environmental problems in many environments. Dust particles, both inhalant (up to 30μ) and respirable (up to 10μ), are known to contaminate food and water, and when inhaled, can result in serious respiratory ailments. In other cases, the presence of coal dust may lead to possible spontaneous combustion. Similar concerns are raised in other mining, chemical, steel and waste industries which generate smoke, dust, ash and other particulate matters. Dust emission is also a problem during road construction and the transportation of coal or pulverised minerals in railway cars or trucks.

The usual method for allaying dust is to apply a water spray either with a fixed or mobile pressurised spray system, gravity fed distribution or by water cannon. Water trucks are commonly used, for example, on mine haulage roads, quarry access, road constructions, unsealed roads and other types of dusty areas supporting traffic. The main problem with using water sprays is that the dust is controlled only for a short period of time depending on climatic conditions. This is particularly the case during road construction where application of the water spray has to be constantly repeated with a frequency of up to every hour or less to provide effective dust control. Even then, the dust abatement performance is often poor and there is a need for ready access to water, which can be particularly difficult to obtain during droughts.

Various methods have been employed to date in knock down dust suppressants and dust dissemination. Incorporation of hygroscopic salts such as calcium or magnesium chloride in the water sprays is often done in an attempt to retain moisture on the dusty surface, but the method is often disadvantageous due to high salt usage rates, moisture scavenging properties and equipment corrosion. Oil and oil-based emulsions, pine resin tall oil, and lignosulfonate as a by-product of paper-mills have been used for dust control purposes. See for example U.S. Pat. No. 4,417,992 which discloses the use of oil-containing emulsions comprising light paraffin solvents, water and cross-linked polymers for dust control. U.S. Pat. No. 4,746,543 discloses the use of an aqueous solution containing a mixture of water soluble acrylic polymers with water soluble non-ionic glycol polymers with sulfonate non-ionic surfactants and co-surfactants as dust control agents. U.S. Pat. No. 4,594,268 discloses the use of an aqueous emulsion of methacrylate polymer as a dust control agent. U.S. Pat. No. 5,194,174 describes the use of non-viscous water based solutions including a polyvinyl alcohol and boric acid for suppressing dust. U.S. Pat. No. 4,801,635 describes a combination of water-soluble anionic acrylic polymers in combination with water-soluble non-ionic glycol polymers in an aqueous medium together with sulfonate surfactants for the control of dust emissions into the environment. U.S. Pat. No. 5,256,444 describes the control of fugitive dust emissions by the application of a water-soluble cationic polymer solution with a foaming agent. European Patent No. 0 134 106 describes compositions for dry dusty soil surface treatment and stabilisation of surface soil by application of an aqueous emulsion of homopolymers and copolymers of acrylic acid and a polybasic salt including surfactants and wetting agents.

Notwithstanding that there is a wide variety of dust suppressant compositions and methods available, there is a need for new, improved or at least alternative dust suppressant compositions for use in knocking down airborne dust and controlling fugitive dust emissions in the road building, waste control, mining, haulage and related industries. For example, road construction companies often revert back to the use of simple but generally ineffective water sprays rather than using aqueous suppressant compositions with durable dust control effect.

BRIEF SUMMARY OF THE INVENTION

The present invention relates to new and improved or at least alternative methods and compositions suitable for controlling fugitive dust emissions from bulk, granular or powdered solids.

According to an aspect of the invention there is provided a concentrate for dust suppression which comprises:
(a) an anionic surfactant;
(b) a fatty acid alkyl ester; and
(c) an acrylic-based copolymer emulsion.

According to another aspect of the present invention there is provided a method of suppressing dust comprising contacting a solid particulate dust producing material with a dust inhibiting amount of a treatment composition comprising a water-diluted concentrate of the invention.

According to another aspect of the invention there is provided a treatment composition for dust suppression comprising a concentrate according to the invention diluted with water.

According to another aspect the compositions of the invention can be used as a knockdown agent for airborne dust and for minimising soil and dust erosion, blowing and loss from roads and bulk solids, controlling coal dust, mineral flotation processes, waste management applications and as a binding agent.

According to yet another aspect of the invention there is provided the use of a fatty acid alkyl ester for improving fugitive dust suppression or knockdown properties of an acrylic copolymer emulsion.

These and other aspects of the invention are evident from the description and claims which follow.

DETAILED DESCRIPTION OF THE INVENTION

In accordance with the invention the dust suppression concentrate is suitable for controlling dust on roads, underground roadways, open-cut mines, on mineral entailing piles, controlling dust and wind erosion from surfaces of pulverised coal and mineral piles contained within open transit carts and on other surfaces having finely divided particles subject to dusting.

The treatment composition of the invention is efficient in creating soil particle cohesion and abating airborne dust. The composition is further useful in wetting, penetrating and improving soil particle agglomeration and reducing water evaporation from soil and particles so treated. These properties assist to suppress dust at locations such as underground mine operations, haul roads, aboveground transfer interchange areas, quarries, road construction operations, stock piles, tips and rubbish dumps.

The dust suppressant compositions of the invention surprisingly show good synergy between the anionic surfactant, fatty acid alkyl ester and acrylic-based copolymer emulsions. The effectiveness of the compositions exceeds the wetting, penetration, durability and control of known suppression agents.

The anionic surfactants for use in the present invention are typical of long chain molecules having a long hydrophobic "tail" and a negatively charged "head". These surfactants are widely used because of their good lathering, detergent and surface active properties. In a preferred embodiment, the sulphonated surfactant is preferably an aliphatic mono- or poly-sulphonated fatty acid, having a surface tension value below 30 dynes/cm.

Aliphatic mono- or poly-sulphonated fatty acids are preferred, such as those containing 8 to 20 and more preferably 8 to 16-carbon atoms in the fatty acid aliphatic chains. Examples of alkyl groups which may be used in the sulphonated fatty acids include, octyl, nonyl, decyl, dodecyl (lauryl), eicosyl, nicosyl, docosyl, tricosyl and tetracosyl group. The alkanoyl groups which may be used are monounsaturated analogues of those above, that is, octenyl, nonenyl and the like.

Alkanolamine and alkanolamide sulphonated fatty acids are preferred such as those containing $C_1$ to $C_{10}$ alkyl groups. These compounds are the condensation products of aliphatic fatty acids and hydroxy alkyl amines. Reference to alkanolamine and alkanolamide sulphonate fatty acids includes the mono-, di- and tri-alkanolamine and alkanolamide condensates. Fatty acid diethanolamide and diethanolamines are versatile and widely used surfactants. Examples of the fatty acid component of such compounds include ricinoleic, lauric, linoleic, tall oil, coco, oleic, stearic, capric and isosteric acid, all of which are described in Kirk-Othmer Encyclopedia of Chemical Technology 3rd Edition, Volume 22, at Table 24, which reference is incorporated herein in its entirety. The most preferred sulphonated fatty acids according to this invention are the commercially available ethanolamine lauryl sulphates, particularly diethanolamine lauryl sulphate.

The fatty acid ethanolamine lauryl sulphates, as well the other sulphonated fatty acid surfactants, are useful for their surfactant and detergent properties. However not all sulphate surfactants proved highly efficient in the compositions of the present invention. Other surfactants such as ethoxylated dodecyl benzene sulphonates and dioctyl sulpho succinic acid surfactants whilst being useful in reducing surface tension and improving wetting and penetration into soil particles were found not to be particularly compatible with the polyvinyl acrylic emulsion copolymer due to coagulation.

The fatty acid alkyl ester is used to provide a low surface tension for the treatment compositions of the invention. Preferred esters of the invention are lactate and soyate esters derivable from corn and soy beans. Reference can be made to a natural ethyl lactate/methyl soyate blend sold under the trade name of Vertec Gold by Vertec Biosolvents. The fatty acid alkyl ester mixture is produced from a blend of ethyl lactate, derived from corn, and methyl soyate, derived from soy bean oil. The ester blend has a low viscosity (5 cp), low surface tension (21.1 dynes & 0.1% sln) and is used as a solvent in degreasing applications and graffiti removal. It is also formulated to be blended with other products such as hand cleaners, ink removers and paint strippers. The ester blend lowers surface tension of the treatment composition to improve wetting and penetration, reduces evaporation (being oil-based), reduces viscosity to improve pouring and mixing, reduces excessive foaming of the surfactant and is believed to form fibrillations with the acrylic copolymer to improve soil particle adhesion at lower application concentrations. Furthermore, this alkyl ester is endorsed by USB (United Soybean Board) as a bio-energy natural derivative for cleaning and gluing functions due to it being derived from natural sources.

Whilst the nature ethyl lactate/methyl soyate blend is particularly preferred, it will be understood that other such natural or synthetic fatty acid alkyl esters and blends thereof may be used in the treatment compositions and methods of the present invention. The fatty acid esters are typically methyl esters of $C_8$-$C_{18}$ fatty acids commonly used as lubricants for metal cutting fluids, high temperature grinding and enamel graffiti removal. The lactate esters are commonly used as a solvent for nitrocellulose, cellulose acetate, resins, lacquers, paints and varnishes. The compounds have low surface tensions preferably below 30 dynes/cm, more preferably around 23 dynes/cm.

Use of acrylic-based copolymers for soil stabilisation, dust suppression and revegetation projects is known. Typically the acrylic polymer is compounded as a waterborne copolymer emulsion and diluted with water to a predetermined solids content before use. The emulsion copolymers can be used to coat soil and sand, binding particles together with a clear flexible film or crust when used in sufficient concentration. This barrier helps prevent erosion of soil and fugitive dust emissions by movement such as caused by wind or water. The acrylic copolymer also tends to reduce moisture evaporation on the soil surface. Once dry, this compound creates a hydrophobic barrier to lock the moisture both present and co-applied in the ground, thus reducing the frequency, volume and need for further applications.

The acrylic-based copolymers employed in the invention include those of acrylic acid and one or more unsaturated aliphatic carboxylic acids such as 2-chloroacrylic acid, 2-bromoacrylic acid, maleic acid, fumaric acid, itaconic acid, methacrylic acid, mesaconic acid or the like or unsaturated compounds copolymerisable with acrylic acid, for example, acrylonitrile, methyl acrylate, methyl methacrylate, vinyl acetate, vinyl propionate, methyl itaconate, styrene, 2-hydroxy ethyl methacrylate and the like. Suitable polyvinyl acrylic copolymers for use in the treatment compositions of the invention may be obtained from various sources including that sold as MARLOC supplied by Reclamare Company, Seattle, USA. This polyvinyl acrylic copolymer is of irreversible elastomeric character when polymerised in the presence of light, heat or catalyst.

Another highly preferred acrylic copolymer is ACROCRYL, a styrene acrylic copolymer emulsion, supplied by Nuplex Industries Australia. It has be observed that compositions of the invention made with ACROCRYL shows higher temperature stability especially around 40-50° C. assisting in storage of the concentrate and application once diluted.

The treatment composition of the invention has been designed to provide for application of acrylic copolymer adhesive agents in lower concentrations. The compositions of the invention are hitherto unknown and the advantages obtained are surprising compared to the polymer emulsions previously known for dust suppression. The compositions once applied penetrate the surface, blocking evaporation and conserving moisture.

Further agents to improve the stability, workability and surfactant properties of the formulations of the invention can be incorporated into the concentrate. For example, viscosifying agents such as hydrophilic polysaccharides may be incorporated to assist product stability at low concentration and partake in the efficiency of soil or dust particle cohesion. Hydrophilic polysaccharides are well known in the art and particular mention can be made of Xanthan gums such as Keizan manufactured by CP Kelco.

Xanthan gums further provide useful properties such as thickening, yeast stabilisation, suspension-ability, flow control, foam stabilisation, coating and film formation and textual quality and modification. The hydrophilic polysaccharides may be used in any form, for example, as isolated from a fermentation broth, or as a reconstituted dry product.

Additional soil wetting agents may be incorporated into the treatment compositions and concentrates of the invention. Representative soil wetting agents include nonionic surface active agents such as ethoxylated alkyl phenols and polyethylene oxide monolaurates.

Humectants such as magnesium chloride or calcium chloride may be formulated into the concentrates and treatment compositions. These chloride salts work well in helping to retain moisture in the treatment composition once applied to the soil or dust particle substrates. Further additives including preservatives, buffers and pH adjustment agents, colorants, formulating agents and the like may be used in the concentrates of the invention as appropriate.

The treatment composition is preferably supplied as a concentrate which is diluted prior to application. The concentrate readily dissolves in water and may be diluted either by controlled addition to a stream of water or added in bulk, such as to a tank of water for application. The treatment concentration can range from about 0.01 to 20%, but -preferably has a low concentration such as from 0.05% to 1.0%, more preferably from about 0.1% solution (1 g/L water) to 1.0% solution (10 g/L water). Water used to dilute the concentrate of this invention can be ordinary tap water, grey water, brackish (salty) water (such as from mines) or hard water (up to 30 grains $CaCO_3$). The treatment composition shows unrivalled efficiency and synergy when compared side-by-side with the individual ingredients, and particularly at the preferred low concentration of about 0.1% solution.

The concentrate and diluted solutions are nonflammable and susceptible to decomposition by soil micro-organisms. Yet the treatment compositions and methods provide effective residual or long term dust control compared to water or simple suppression formulations from a few hours or a day (at concentrations below 0.1%) to up to 7 days or more (at concentrations above 0.1%)

In controlled field trials, the compositions of the invention were found to provide 3 to 4 times more moisture conservation when used on dusty roads than water alone. The results suggest that when compared to the use of water at the same application rate and exposure time and conditions, the compositions of the invention were efficient in reducing respirable dust volume by 77% and inhalant dust volume by 78% at 0.2% concentration.

The compositions of the invention are also suitable for mineral flotation processes, separation and mineral washes due to the detergent effect of the surfactant compositions.

The compositions may also be used as a binding agent for seed germination control where seeds are anchored to their sowing location until germination takes place.

It will be understood that different concentrations, application rates and protocols, preferred water types, flow rates and nozzle applicator sizes and additives and diluents may be monitored depending on the dust suppression required, substrate or soil type encountered and the like as would be well known or ascertainable by one skilled in the art.

The present invention will now be described with respect to non-limiting examples which are regarded solely as illustrative and not unnecessarily restricting on the scope of the invention.

EXAMPLES

1. Concentrates

The dust suppression concentrate of the invention is prepared by required mixing order to avoid lumps and coagulation and ageing stability. The fatty acid alkyl esters (Vertec Gold) are emulsified with the anionic surfactant (Gardinol DA) for at least 30 minutes. The viscofying agent (Xanthan polysaccharide gum) is then added to the vortex to be dispersed in the emulsified esters and surfactant for at least 30 minutes. Once the Xanthan gum wets and expands, water is added to thin out the dispersion. The acrylic-based copolymer (MARLOC or ACROCRYL) is added as final step to provide a concentrate of about 40-55% solids and having a surface tension of about 27-29 dynes/cm. The final homogenisation is performed for minimum an hour. Representative concentrates are depicted in Table 1 below:

TABLE 1

| | | Exemplified Formulations and Range (% weight) | | | | | | |
|---|---|---|---|---|---|---|---|---|
| Ingredient | Trade Name | Ex. 1 | Ex. 2 | Ex. 3 | Ex. 4 | Ex. 5 | Ex. 6 | Range |
| 1. DEA Alkyl Sulphate | Gardinol DA | 10 | 10 | 12 | 12 | 12 | 12 | 2-20 |
| 2. Methyl Soyate/ Ethyl Lactate Blend | Vertec Gold | 10 | 6 | 10 | 6.2 | 6.25 | 6.35 | 5-20 |
| 3. Xanthan gum | Kelzan | 2 | — | 3 | 0.1 | 0.05 | 0.05 | 0-3.0 |
| 4. Water | Tap | — | — | — | 2 | 5 | 2 | 0-10 |
| 5. Polyvinyl Acrylic Copolymer | MARLOC | 78 | 84 | 75 | 79.7 | 76.7 | — | 30-95 |
| 6. Styrene Acrylate Copolymer | ACROCRYL | — | — | — | — | — | 79.6 | 30-95 |

2. Treatment Compositions

The dust suppressant treatment compositions were prepared by diluting 1/1,000 of the concentrate to water. The efficiency of the treatment composition as a dust suppressant was evaluated by adding a 30 ml aliquot of the 0.1% solution on to 100 g of ground top soil in a 1 L jar with an opening of 70 mm in diameter. Comparative examples were prepared in parallel and compared with each of the individual components at the same 0.1% concentration.

The jars were charged with ground top soil to which the treatment compositions were added and then exposed untouched under high draft in an 8-cubic meter fumehood at a temperature of 21° C. and 35% relative humidity. After 36 hours of evaporation the jars were tumbled at 60 rpm for 30 minutes.

The efficiency of the treatment compositions was assessed by observing the disintegration of the cake into loose soil particles. It was found that the soil cakes for various ingredients including polyvinyl acrylic copolymers (MARLOC) were observed to have disintegrated into loose powder under the tumbling action. The loose powder has the reversed consistency of ground topsoil that becomes airborne under turbulence. In comparison, the treatment compositions of the invention were found to hold the cakes intact after 30 minutes of tumbling at 60 rpm. The results for the tumble test are depicted in Table 2 below.

TABLE 2

Comparative Tumble Test Results after 36 hours evaporation

| Product | Chemical | Solids of Concentration | pH 0.1% @ 22° C. | Surface Tension 0.1% | Evaporation Tumble Test 0.1% |
|---|---|---|---|---|---|
| Water | tap | Nil | 7.1 | 59.5 | 3/3 fail |
| Marloc | Polyvinyl Acrylic | 60% | 6.6 | 35.0 | 3/3 fail |
| Duskil | Pine Resin Emulsion | 35% | 6.9 | 27.3 | 3/3 fail |
| MgCl$_2$ | Inorganic Salt | 100% | 7.2 | 42.4 | 3/3 fail |
| 3M Dust Suppressant | Ex. 4 & Ex. 5 | 40-55% | 6.5 | 27.1 | 3/3 PASS |

The concentrates and treatment compositions of the invention are found to be efficient in dust suppression across a wide range of situations and conditions. The treatment composition is found to be effective in wetting, penetrating and improving soil and dust particle cohesion and reduces water evaporation. The achieved properties assist to suppress dust at locations such as underground mine operations, haul roads, aboveground transfer interchange areas, quarries, road construction operations and stock-piles. The treatment compositions show strong synergism with the three main components being the anionic surfactant, fatty acid alkyl esters and polyvinyl acrylic emulsion copolymer.

The concentrate of Ex. 6 containing the styrene acrylate copolymer ACROCRYL was diluted with tap water at various low concentrations. Surface tension values of below 30 dynes/cm provide for good wetting of substrates. The surface tension of the resultant treatment composition was below 30 dynes/cm at all lower concentrations ranging from 0.012 to 0.10 compared to tap water (reference) at about 52 dynes/cm. Higher concentrations of composition to water likewise have surface tensions well below 30 dynes/cm, more preferably below 26 dynes/cm. That is, even at high dilution (and hence low concentration), the product concentrates still gave treatment compositions having surface tensions below 30 dynes/cm post dilution. The treatment compositions thereby exhibiting excellent wetting ability. The results are shown in Table 3 below.

TABLE 3

Surface tension studies of low concentration treatment compositions from the Example 6 concentrate in tap water (dynes/cm)

| % Concentration Example 6 | Surface Tension |
|---|---|
| — | 52.0 (water) |
| 0.012 | 29.7 |
| 0.025 | 27.7 |
| 0.050 | 27.6 |
| 0.075 | 27.3 |
| 0.10 | 26.2 |

3. Field Trials

The Nepean Gorge Lookout road in the Blue Mountains National Park, New South Wales, Australia has a gravel road being a mixture of blue metal and powdery dust covering clayed compacted soil. Driving vehicles on the road is a major source of inhalant and respirable dust emissions.

A 7,000 liter water truck equipped with drip bar, shower heads and water cannon driven by a motorised pump was supplied by Penrith City Council. Tests were conducted with water and the Ex. 6 composition of the invention diluted with water to 2:1,000 (0.2%) at an application rate of about 8-10 L/m$^2$ and truck speed of 10 km/h over 6 passes with 10 minute gaps. On day 2 and 3, the application volume was reduced to half and quarter respecitvely. Three days following the last application, the truck was driven along the road at 40-50 km/h for 10 passes to generate the dust for collection.

Dust suppressant treatment compositions were prepared in situ by diluting 14 L of the concentrate directly into the 7,000 water tank. Dissolution was competed by self-mixing following normal agitation following driving the truck for about 200 m. At slow speeds, sudden brake motions further assisted mixing.

Samples from the tank showed good mixing with the composition having a pH of about 7.1 and surface tension of about 28.5 dynes/cm.

Dry soil was taken from tyre tracks of non-treated areas a day before application. The surface was dug with a crowbar to about 2.5 cm depth and the soil collected in plastic vials and sealed for moisture analysis. Further samples were taken following application of either water or diluted concentrate as above at 24, 48 and 72 hours and 10 days in a similar manner. The weather conditions were sunny to partly cloudy and overcast, light to moderate winds and maximum temperatures ranging from about 25-32° C.

Dust volume recording was conducted by Coal Services Health Environmental Monitoring according to Australian Standards for gravimetric weight gain observation. DuPonnt air sampling pumps were employed to aspire dust particles into Cassella Cyclone monitors (respirable dust) and IOM 25 mm open-face samplers (inhalant dust).

An analysis of moisture retention of the treated and untreated soil was made at 24, 48 and 72 hours and after 10 days using a forced air oven at 100 C under standard conditions. The results are set out in Table 4 below:

TABLE 4

Moisture Retention Analysis (% average moisture)

| Test Product | 24 h | 48 h | 72 h | 10 days |
|---|---|---|---|---|
| Water | 2.14 | 2.22 | 2.51 | 2.34 |
| Ex. 6 (0.2%) in water | 6.06 | 6.41 | 10.7 | 3.71 |

The compositions of the invention were found to be highly effective at retaining moisture compared to water alone. After 24 hours a 2.8 times improvement was observed, after 48 hours a 2.9 times improvement and after 72 hours a remarkable 4.3 times improvement. Even after 10 days an improvement of about 1.6 times that of water alone was observed.

These results translated into remarkable dust suppression results for the compositions of the invention. Table 5 below shows the results of dust generation studies for the soil at 3 days (72 hours) post treatment.

TABLE 5

Dust Generation Studies at 72 Hours (mg/m$^3$)

| Test Product | Inhalant | Respirable |
|---|---|---|
| Water | 8.9 | 1.9 |
| Ex. 6 (0.2%) in water | 5.1 | 1.1 |

The compositions of the invention were found to be highly effective at suppressing both inhalant and respirable dust at about 1.7 times as compared to water alone.

Following an initial heavy application, periodic application of the compositions of the invention (about once or twice a day to every two days) would save water, labour and equipment cost over conventional road and surface wetting procedures. A typical application protocol is:

WEEK 1: Day 1: Apply 0.2% composition at 8-10 L/m$^2$ with up to 6-8 passes and a gap of 10 minutes
Days 2-7: 2 continuous passes per day
WEEK 2: 2 continuous passes twice a week
WEEK 3 (onwards): 2 continuous passes once a week or as needed The compositions greatly assist in moisture retention and conservation and particle agglomeration. On average, the compositions of the invention have about 3 times more moisture retention activity than water alone and at least 50% more dust abatement ability than water alone. Use of polyvinyl acrylic copolymer emulsions in the compositions of the invention such as from test Examples 4 and 5 gave similar dust suppression and abatement results.

The compositions of the invention also show improved handling and activity over similar known dust suppression agents. The compositions are easy to handle, readily miscible with water from various sources and do not need prior dilution.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification individually or collectively, and any and all combinations of any two or more of said steps or features.

The reference to any prior art in this specification is not, and should not be taken as, an acknowledgment or any form of suggestion that the prior art forms part of the common general knowledge in the field of endeavour.

The invention claimed is:

1. A concentrate for dust suppression which comprises:
   (a) a long chain alkanolamine sulfphonated fatty acid anionic surfactant;
   (b) a fatty acid alkyl ester; and
   (c) an acrylic-based copolymer emulsion.

2. A concentrate of claim 1, wherein the alkanolamine sulphonated fatty acid is diethanolamine lauryl sulphate.

3. A concentrate of claim 1, wherein the anionic surfactant has a surface tension below about 30 dynes/cm.

4. A concentrate of claim 1, wherein the fatty acid alkyl ester comprises ethyl lactate and methyl soyate.

5. A concentrate of claim 1, wherein the fatty acid alkyl ester has a surface tension below about 30 dynes/cm.

6. A concentrate of claim 5, wherein the fatty acid alkyl ester has a surface tension below about 23 dynes/cm.

7. A concentrate of claim 1, wherein the acrylic-based copolymer emulsion is a hydrophilic and biodegradable compound which polymerises as an irreversible elastomeric structure upon evaporation or drying.

8. A concentrate of claim 1, wherein the acrylic-based copolymer emulsion is a polyvinyl acrylic copolymer emulsion.

9. A concentrate of claim 1, wherein the acrylic-based copolymer emulsion is a styrene acrylate copolymer emulsion.

10. A concentrate of claim 1 which further comprises a polysaccharide viscosifying agent.

11. A concentrate of claim 10, wherein the polysaccharide viscosifying agent is a xanthan gum.

12. A method of suppressing dust comprising contacting a solid particulate dust producing material with a treatment composition comprising a water-diluted concentrate according to claim 1.

13. A treatment composition for dust suppression comprising a concentrate according to claim 1 diluted with water.

14. A treatment composition of claim 13, wherein the concentration is from about 1:10,000 to about 1:100 of concentrate to water.

15. A treatment composition of claim 14, wherein the concentration is from about 1:1,000 to about 5:1,000 of concentrate to water.

16. A treatment composition of claim 15, wherein the concentration is about 2:1,000 of concentrate to water.

17. A treatment composition according to claim 13, wherein the water is ordinary tap water, grey water, brackish water or hard water.

18. A treatment composition of claim 13 having a surface tension below about 30 dynes/cm.

19. A treatment composition of claim 18 having a surface tension of about 26 dynes/cm or below.

20. A concentrate for dust suppression which comprises:
   (a) from about 2 to about 20 wt. % of a long chain alkanolamine sulphonated fatty acid anionic surfactant;
   (b) from about 5 to about 20 wt. % of a fatty acid alkyl ester;
   (c) from about 30 to about 95 wt. % of an acrylic-based copolymer emulsion;
   (d) from 0 to about 3 wt. % of a polysaccharide viscosifying agent; and
   (e) from 0 to about 10 wt. % of water.

21. A concentrate of claim 20, wherein the fatty acid alkyl ester comprises ethyl lactate and methyl soyate.

22. A concentrate of claim 20, wherein the acrylic-based copolymer emulsion is a polyvinyl acrylic copolymer emulsion.

23. A concentrate of claim 20, wherein the acrylic-based copolymer emulsion is a styrene acrylate copolymer emulsion.

* * * * *

UNITED STATES PATENT AND TRADEMARK OFFICE
CERTIFICATE OF CORRECTION

| | | |
|---|---|---|
| PATENT NO. | : 8,052,890 B2 | Page 1 of 1 |
| APPLICATION NO. | : 11/628273 | |
| DATED | : November 8, 2011 | |
| INVENTOR(S) | : John Giao Nguyen | |

It is certified that error appears in the above-identified patent and that said Letters Patent is hereby corrected as shown below:

Column 1
Line 3, Below "Title",
Insert -- CROSS REFERENCE TO RELATED APPLICATIONS
This application is a national stage filing under 35 U.S.C. 371 of PCT/US2005/019476
filed June 2, 2005, which claims priority of Australian Application No. 2004902960;
filed June 3, 2004, the disclosure of which is incorporated by reference in its/their
entirety herein. --

Column 3
Line 40-44, Delete "The most preferred sulphonated fatty acids according to this
invention are the commercially available ethanolamine lauryl sulphates, particularly
dietheanolamine lauryl sulphate." and insert the same on Column 3, Line 43, as a new
paragraph.

Column 5
Line 7, Delete "Keizan" and insert -- keizan --, therefor.
Line 64, Delete "0.1%)" and insert -- 0.1%). --, therefor.

Column 6
Line 30, Delete "viscofying" and insert -- viscosifying --, therefor.

Column 8
Line 27, Delete "respecitvely." and insert -- respectively. --, therefor.
Line 51, Delete "DuPonnt" and insert -- DuPont --, therefor.

Column 9
Line 61, In Claim 1, delete "sulfphonated" and insert -- sulphonated --, therefor.

Signed and Sealed this
Twenty-fourth Day of April, 2012

David J. Kappos
*Director of the United States Patent and Trademark Office*